(12) United States Patent
Weatherford (10) Patent No.: US 8,169,360 B1
(45) Date of Patent: May 1, 2012

(54) SYSTEMS AND METHODS OF RANGE TRACKING

(75) Inventor: Shaun David Weatherford, Camarillo, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 13/013,174

(22) Filed: Jan. 25, 2011

Related U.S. Application Data (62) Division of application No. 13/012,427, filed on Jan. 24, 2011.

(51) Int. Cl.
*G01S 13/60* (2006.01)

(52) U.S. Cl. ............ 342/109; 342/62; 342/63; 342/70

(58) Field of Classification Search ............ 342/70–72, 342/109
See application file for complete search history.

(56) References Cited

U.S. PATENT DOCUMENTS

| | | | | |
|---|---|---|---|---|
| 3,080,558 A * | 3/1963 | Rust | | 342/128 |
| 4,150,375 A * | 4/1979 | Ross et al. | | 342/21 |
| 5,517,197 A * | 5/1996 | Algeo et al. | | 342/70 |
| 5,969,667 A * | 10/1999 | Farmer et al. | | 342/165 |
| 6,664,920 B1 * | 12/2003 | Mott et al. | | 342/129 |
| 6,683,557 B2 * | 1/2004 | Pleva et al. | | 342/74 |
| 6,707,419 B2 * | 3/2004 | Woodington et al. | | 342/200 |
| 6,816,107 B2 * | 11/2004 | Pleva et al. | | 342/74 |
| 6,864,832 B2 * | 3/2005 | Mende et al. | | 342/70 |
| 6,977,609 B2 * | 12/2005 | Pleva et al. | | 342/28 |
| 7,652,616 B2 * | 1/2010 | Inaba | | 342/70 |
| 7,675,458 B2 * | 3/2010 | Hubbard et al. | | 342/159 |
| 7,791,528 B2 * | 9/2010 | Klotzbuecher et al. | | 342/112 |
| 2002/0014989 A1 * | 2/2002 | Winter et al. | | 342/174 |
| 2005/0156780 A1 * | 7/2005 | Bonthron et al. | | 342/107 |
| 2005/0225481 A1 * | 10/2005 | Bonthron | | 342/175 |
| 2006/0262007 A1 * | 11/2006 | Bonthron et al. | | 342/70 |
| 2007/0152871 A1 * | 7/2007 | Puglia | | 342/70 |
| 2009/0085796 A1 * | 4/2009 | Kuroda et al. | | 342/129 |

* cited by examiner

*Primary Examiner* — Thomas Tarcza
*Assistant Examiner* — Matthew M Barker
(74) *Attorney, Agent, or Firm* — Christopher L. Blackburn (57) ABSTRACT

A system(s) and method(s) of tracking a target(s). Systems include at least one electronic waveform processor operatively associated with an apparent emitted signal electronic sensor and a reflected signal electronic sensor and configured and programmed to generate an estimate of the range from an object to the target and an estimate of the closing velocity of the object to the target by processing a semi-active mode apparent emitted signal and a reflected signal.

16 Claims, 5 Drawing Sheets

SYSTEMS AND METHODS OF RANGE TRACKING

CROSS-REFERENCE TO RELATED APPLICATIONS

This is a divisional application, claiming the benefit of parent application Ser. No. 13/012,427 filed on Jan. 24, 2011, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Embodiments of the invention generally relate to a radar system and/or method for tracking a target using a plurality of modules.

It is to be understood that the foregoing and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION

Embodiments of the invention generally relate to a radar system and/or method for tracking a target. Embodiments of the invention include an electronic transmitter adapted to emit a non-linear swept electromagnetic FM signal. The non-linear swept electromagnetic FM signal has a waveform mathematically described by a second-order-polynomial.

Figure 1:
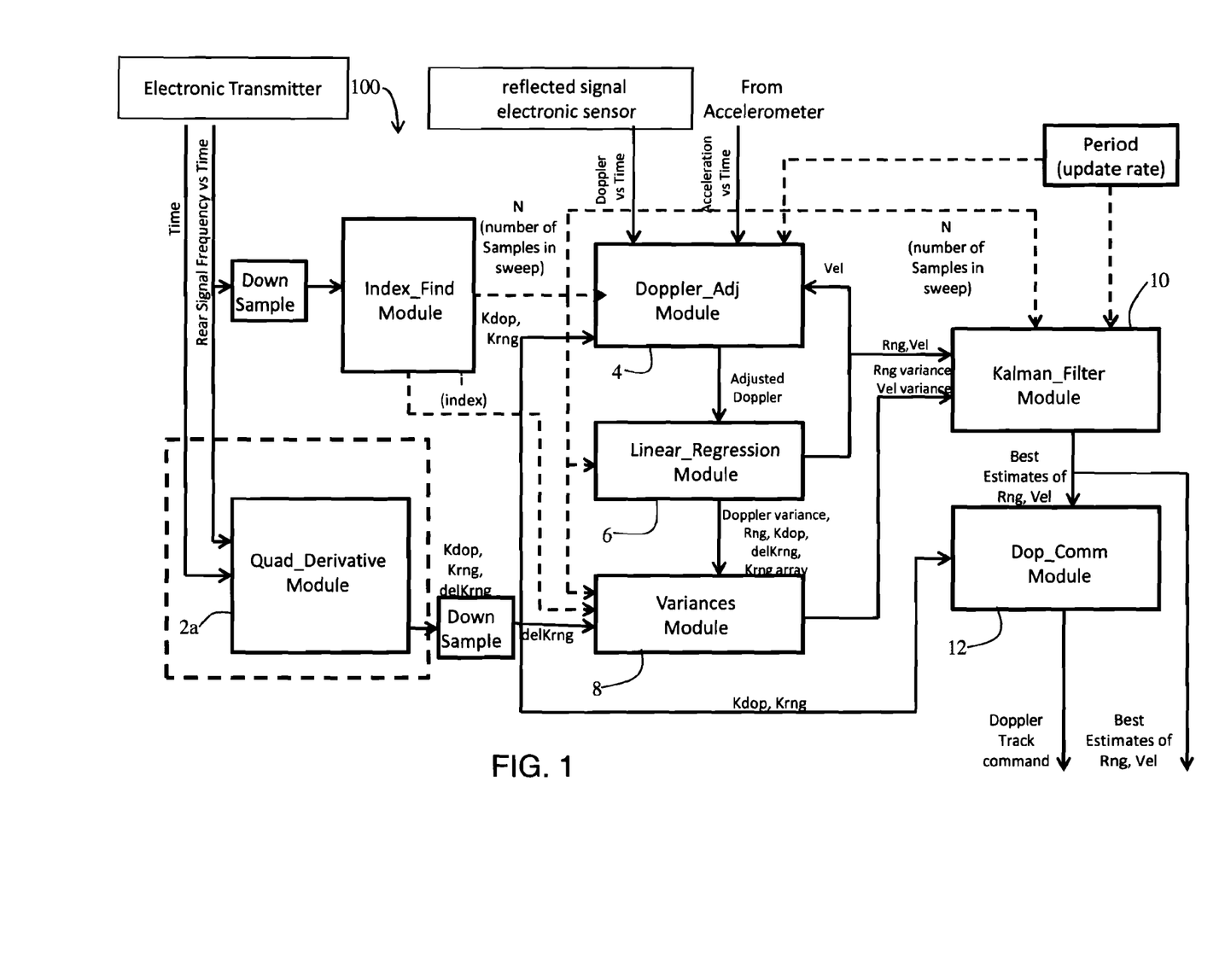
FIG. 1 is a block diagram of an embodiment of modules used in an Active-Mode embodiment of the invention that uses a quadratic derivative module.
Figure 2:
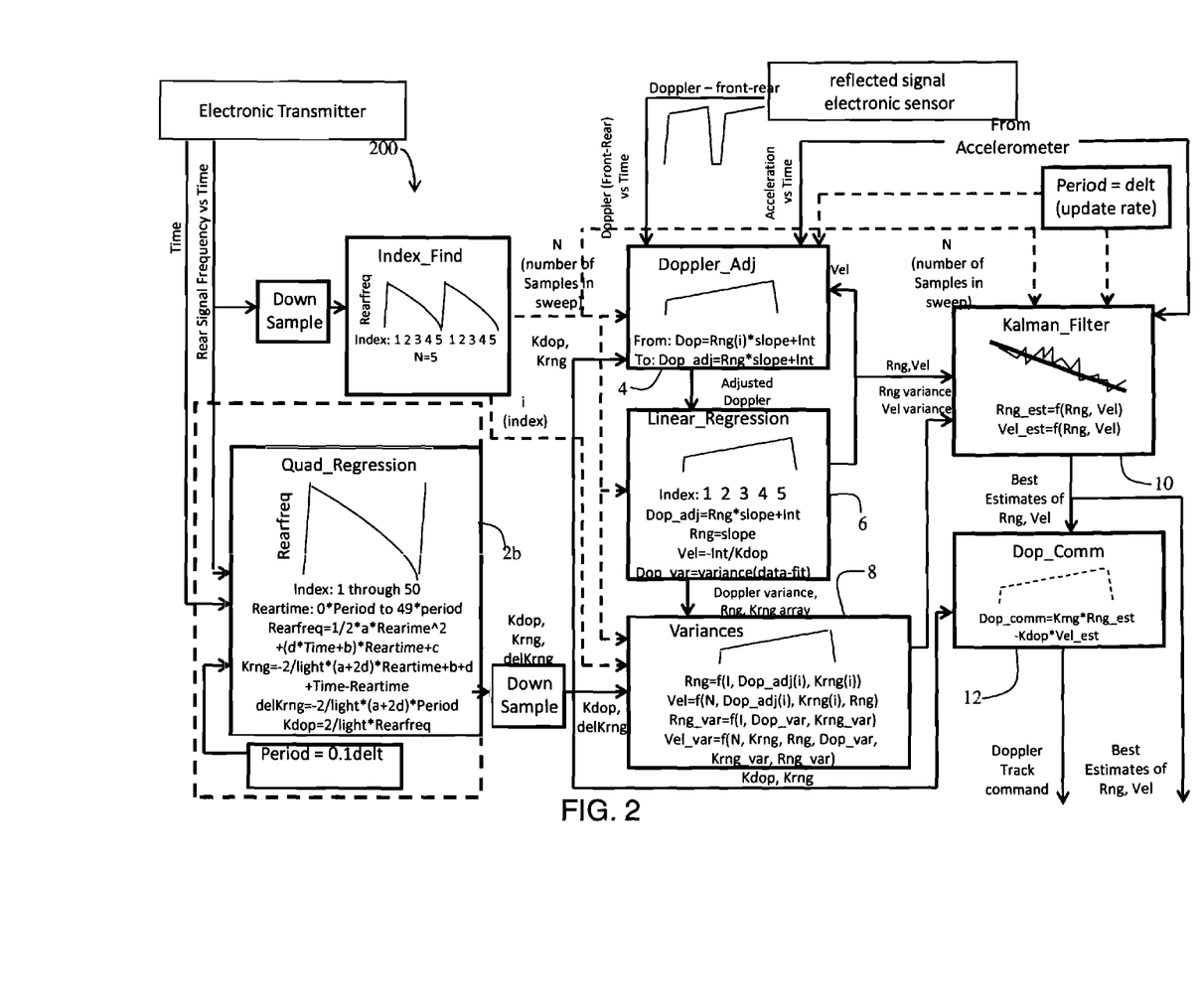
FIG. 2 is a block diagram of an embodiment of modules used in an Active-Mode embodiment of the invention that uses a quadratic regression module.
Figure 3:
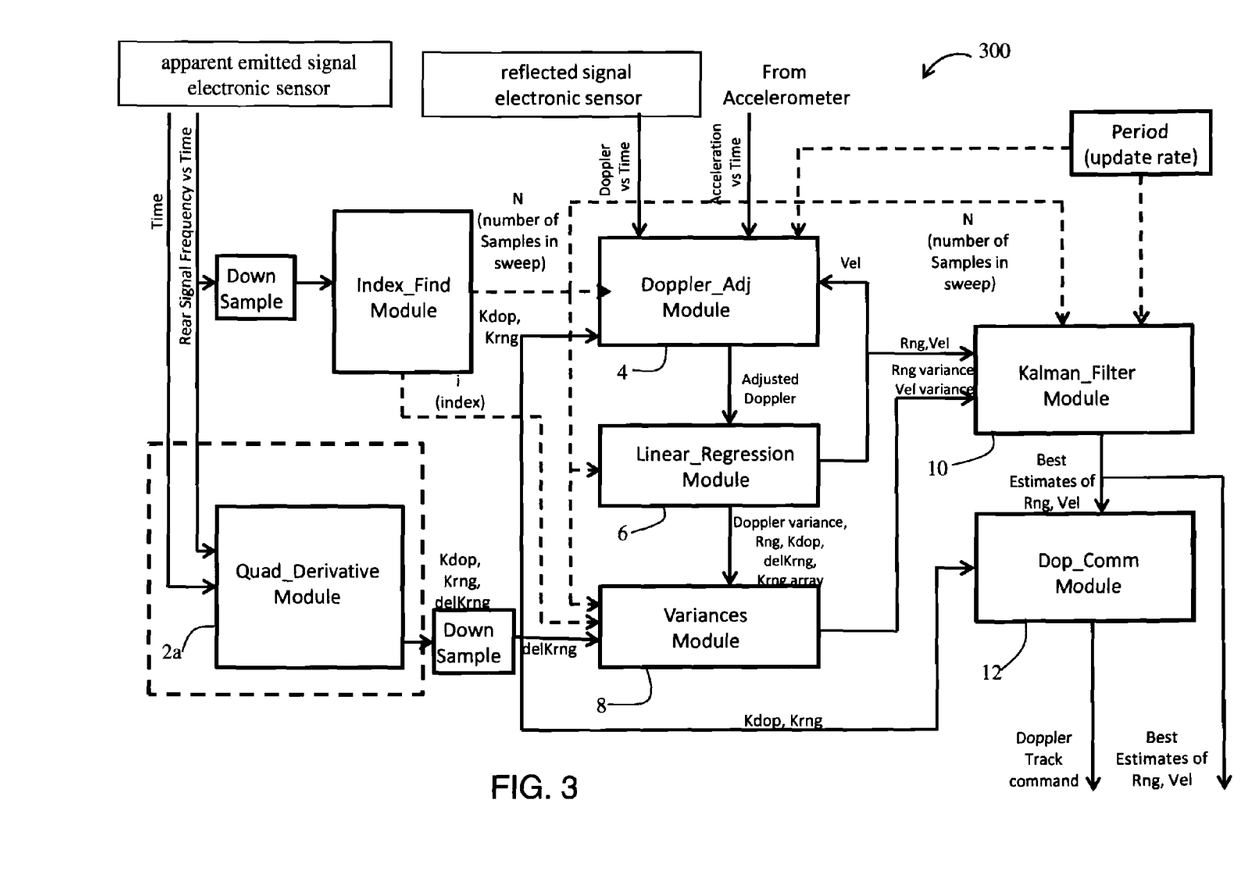
FIG. 3 is a block diagram of an embodiment of modules used in an Semi-Active-Mode embodiment of the invention that uses a quadratic derivative module.
Figure 4:
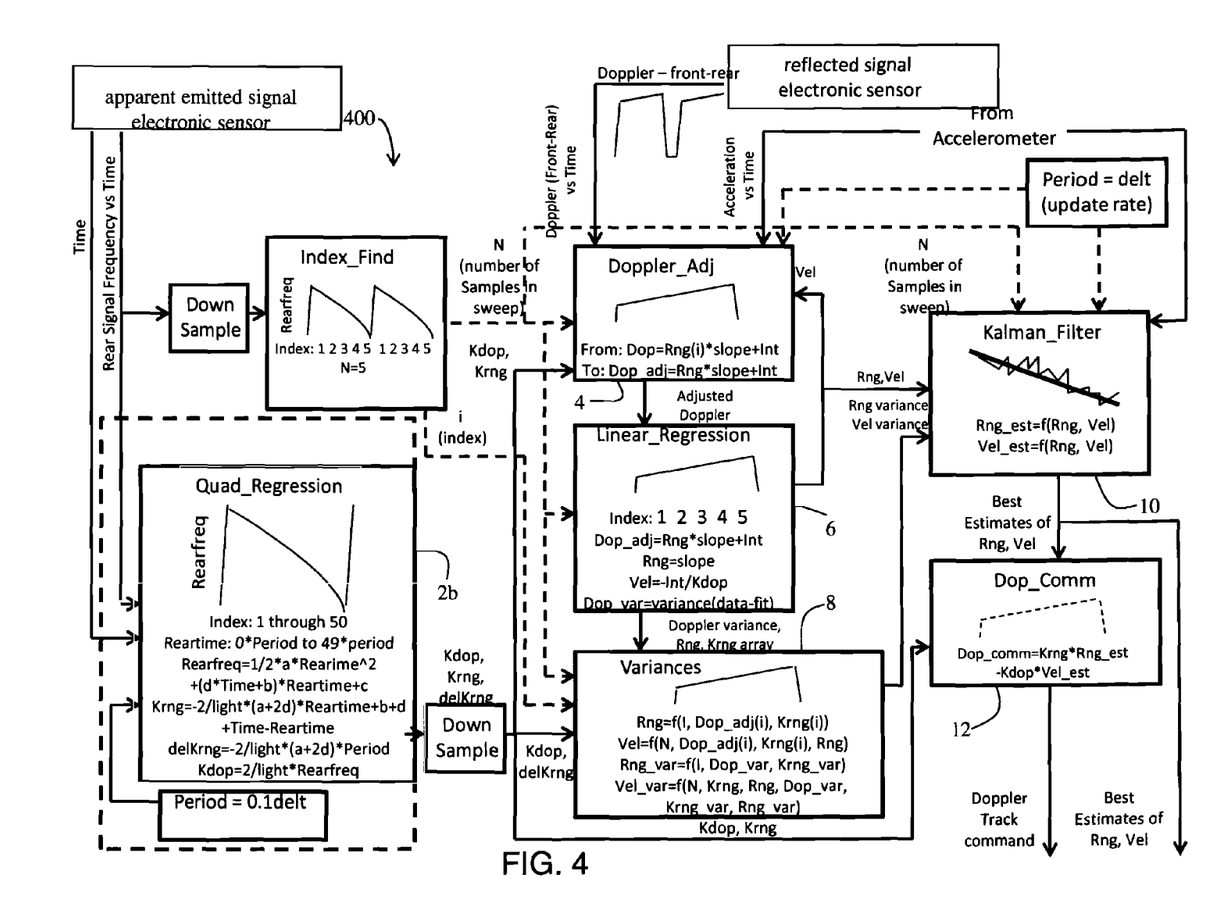
FIG. 4 is a block diagram of an embodiment of modules used in an Semi-Active-Mode embodiment of the invention that uses a quadratic regression module.
Figure 5:
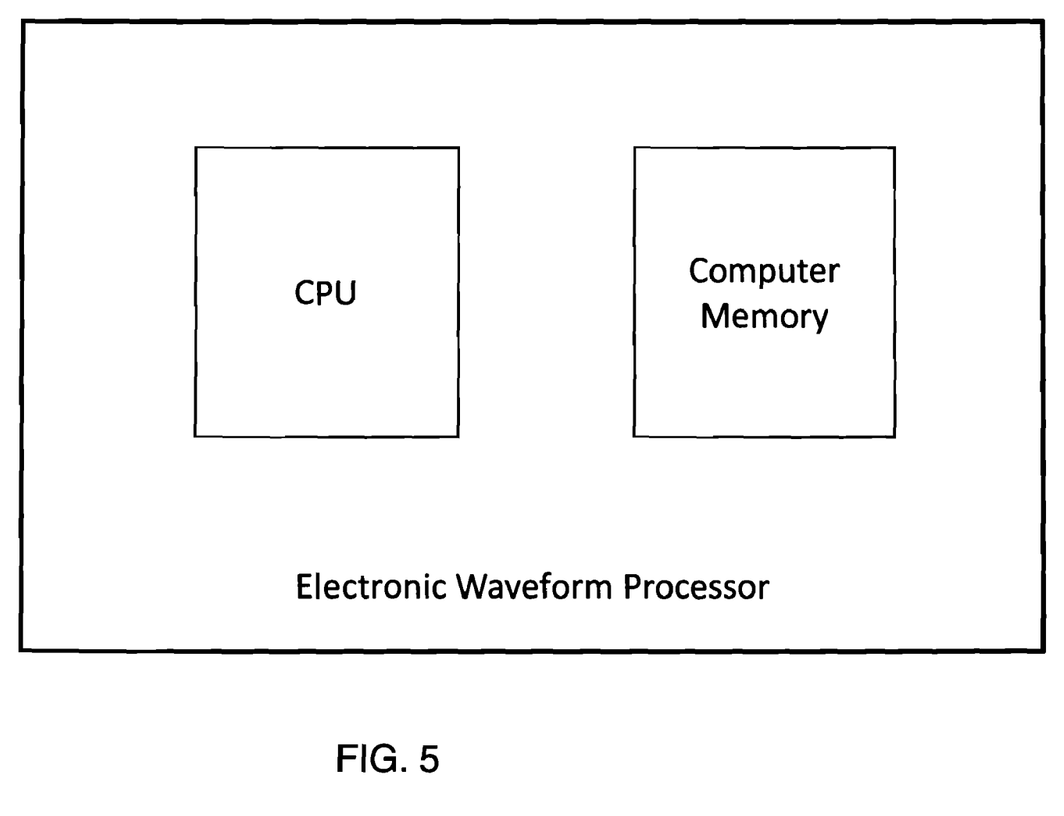
FIG. 5 illustrates a block diagram of an embodiment of an electronic waveform processor, including at least some of the processor's associated components as described in the Detailed Description.

In some embodiments, the non-linear swept electromagnetic FM signal is transmitted from an electronic transmitter electromechanically associated with an object other than the object for which a range (to a target) and/or closing velocity (to the target) will be estimated. In these embodiments, the object with which the electronic transmitter is electromechanically associated could be any object, such as, for example, a vehicle, such as an aircraft (including an UAV), water-going vessel, or land-going vessel. In these embodiments, an 'apparent emitted signal electronic sensor' associated with the object whose range and closing velocity to a target will be estimated is adapted to receive a 'semi-active mode apparent emitted signal'. The 'semi-active mode apparent emitted signal' corresponds to the non-linear swept electromagnetic signal emitted from the electronic transmitter. In these embodiments, an electronic waveform processor is operatively associated with the 'apparent emitted signal electronic sensor' such that the electronic waveform processor can electronically process the 'semi-active mode apparent emitted signal' received by the 'apparent emitted signal electronic sensor'. With reference to FIG. 5, as used in this specification including the claims, an 'electronic waveform processor' 500 includes a CPU 502, of any physical form, and computer memory 504 on which a sequence(s) of instructions executable by the CPU is/are stored; a sequence of stored instructions is referred to as a 'module' and the CPU is adapted to execute the 'modules'.

In other embodiments, the non-linear swept electromagnetic FM signal is emitted from an electronic transmitter electromechanically associated with the object for which a range and/or closing velocity will be estimated. In these embodiments, the non-linear swept electromagnetic FM signal emitted from the electronic transmitter is communicated to the electronic waveform processor that is operatively associated with the electronic transmitter via a guided transmission medium/media; the non-linear swept electromagnetic FM signal emitted from the electronic transmitter via the guided transmission medium/media corresponds to the non-linear swept electromagnetic FM signal emitted from the electronic transmitter and is referred to in this specification including the claims as a 'active mode emitted signal'.

The term 'apparent emitted signal' is used in this specification including the claims to describe the signal corresponding to the emitted non-linear swept electromagnetic FM signal ('semi-active mode apparent emitted signal' and/or 'active mode apparent emitted signal') that is provided to the electronic waveform processor and is intended to simulate the actual non-linear swept electromagnetic FM signal emitted by the electronic transmitter. Table 1 provides definitions of variables used in Tables 2, 3, 4, 5, 6, and/or 7.

TABLE 1

Variable Definitions light = speed of light in feet/second
time_in_sweep = time since beginning of sweep, in seconds
a = see FIG. 6
b = see FIG. 6
c = see FIG. 6
d = see FIG. 6
k = see FIG. 6
A1 = first sweep's value of A
A2 = second sweep's value of A
B1 = first sweep's value of B
B2 = second sweep's value of B
period = length of time between each digitized sample
Velprev = value of velocity at previous sample time
Accprev = value of acceleration at previous sample time $$KN1 \frac{N}{delk * \left( N \sum_{i=1}^{N} (i^2) - \left( \sum_{i=1}^{N} i \right)^2 \right)}$$

TABLE 1-continued

Variable Definitions $$KN2 = \frac{\sum_{i=1}^{N} i}{delk * \left(N \sum_{i=1}^{N} (i^2) - \left(\sum_{i=1}^{N} i\right)^2\right)}$$

$$\frac{1}{Kdop}$$

$$\frac{delk * \left(\sum_{i=1}^{N} i - N\right)}{N * Kdop}$$

$$\frac{1}{N * Kdop}$$

$$\frac{N}{delk * \left(N \sum_{i=1}^{N} (i^2) - \left(\sum_{i=1}^{N} i\right)^2\right)}$$

$$\frac{\sum_{i=1}^{N} i}{delk * \left(N \sum_{i=1}^{N} (i^2) - \left(\sum_{i=1}^{N} i\right)^2\right)}$$

Embodiments further include at least one 'reflected signal electronic sensor' (not illustrated) adapted to receive the semi-active mode apparent emitted signal and associated with an object whose range and closing velocity to a target will be estimated. At least one of the at least one 'reflected signal electronic sensor' is adapted to receive a 'reflected signal'; the 'reflected signal' corresponds to the non-linear swept electromagnetic signal emitted from the electronic transmitter and having been reflected from the target.

Embodiments further include at least one electronic waveform processor operatively associated with the at least one 'reflected signal electronic sensor' and configured and programmed to process the 'apparent emitted signal' and the 'reflected signal' to generate an estimate of the range from the object to the target and an estimate of the closing velocity of the object to the target. With reference to FIGS. 1-4, the electronic waveform processor includes a CPU and a plurality of modules (100, 200, 300, 400) executably associated with the CPU.

With reference to FIGS. 1-4, in some embodiments, the plurality of modules includes at least one 'Emitted Signal Characteristics' module 2a, 2b. When run by the electronic waveform processor, the 'Emitted Signal Characteristics' module 2a, 2b causes the electronic waveform processor to calculate predetermined characteristics of the 'apparent emitted signal'. The predetermined characteristics of the non-linear swept electromagnetic signal include, but not limited to: 1) an expected frequency change in the 'apparent Doppler shift' (between the apparent emitted signal and 'reflected signal') with respect to change in closing velocity—this characteristic referred to in this specification including the claims as 'kdop'; 2) an expected frequency change in the 'apparent Doppler shift' with respect to change in range from the object to the target—this characteristic referred to in this specification including the claims as 'krng'; and 3) expected rate of change of 'krng' during a given FM sweep—this characteristic referred to in this specification including the claims as 'delkrng'. 'apparent Doppler shift' is described by Equation 1.

apparent Doppler shift=$Krng*Rng-Kdop*Vel$,   Equation 1 where 'Krng' and 'Kdop' are as defined in the preceding paragraph, 'Rng' is the distance from the object to the target, and 'Vel' is the closing velocity of the object to the target.

Any method of solving for Krng, Kdop, and Delkrng may be implemented through the 'Emitted Signal Characteristics' module 2a, 2b in accordance with the principles of the invention. The 'Emitted Signal Characteristics' module 2a, 2b includes instructions for causing the electronic waveform processor to calculate values for the variables a, b, c, and d; the Emitted Signal Characteristics module 2a, 2b also contains instructions for causing the electronic waveform processor to derive Krng, Kdop, and Delkrng using the mathematical relationships described in the equations in Table 2.

TABLE 2

Krng, Kdop, Delkrng

Krng = [(−2/light) * (A * time_in_sweep + b)]
A = a + 2d, B = d * k + b, C = c
Krng = [(−2/light) * ((a + 2d) * time_in_sweep + d * k + b)]
Note that for non-changing average Krng, d = 0, and the above equation reverts to:
Krng = [(−2/light) * (a * time_in_sweep + b)], as expected.
delKrng = −2/light * (a + 2 * d) * Period
Kdop = 2/light * Rearfreqdbl For illustrative purposes, two ways of solving for the a, b, c, and d variable values that can be implemented through the 'Emitted Signal Characteristics' module 2 are presented. The first described way is referred to as a 'Quad Regression' module 2b in FIGS. 2 and 4, which uses quadratic regression and is described in Table 3.

TABLE 3

Quadratic Regression

In the following equation, "b" is time dependent :
  Freq_rear = ½ * a * time_in_sweep^2 + (d * time + b) *
  time_in_sweep + c
But during a given sweep, time = time_in_sweep + k :
  Freq_rear = ½ * a * time_in_sweep^2 + [d * (time_in_sweep + k) +
  b] * time_in_sweep + c
  Freq_rear = ½ * (a + 2 * d) * time_in_sweep^2 + (d * k + b) *
  time_in_sweep + c
  Freq_rear = ½ * A * time_in_sweep^2 + B * time_in_sweep + C
Where
  A = a + 2d, B = d * k + b, C = c
Using polynomial regression, can find A, B and C;
then, from two consecutive sweeps A, B and C values, can calculate the rest:
  A1 = a + 2 * d
  B1 = d * k1 + b
  B2 = d * k2 + b
Now solving for a, b, c and d :
  d = (B1 − B2)/(k1 − k2)
  a = A1 − 2 * d or a = A2 − 2 * d
  b = B1 − d * k1 or b = B2 − d * k2
  c = C The second described way of solving for the a, b, c, and d variable values that can be implemented in the 'Emitted Signal Characteristics' module is referred to as 'Quad Deriv' module 2a in FIGS. 1 and 3, uses quadratic derivation, and is described in Table 4.

TABLE 4

Quadratic Derivation

For better range and vel discrimination,
illuminator can make "b" time dependent:
   Freq_rear = 1/2 * a * time_in_sweep^2 +
   (d * time + b) * time_in_sweep + c
But during a given sweep, time = time_in_sweep + k:
   Freq_rear = 1/2 * a * time_in_sweep^2 +
   [d * (time_in_sweep + k) + b] * time_in_sweep + c
   Freq_rear = 1/2 * (a + 2 * d) * time_in_sweep^2 +
   (d * k + b) * time_in_sweep + c
   Freq_rear = 1/2 * A * time_in_sweep^2 + B * time_in_sweep + C
Where   A = a + 2d,   B = d * k + b,   C = c
From 1st and 2nd derivatives of Freq_rear, can find A, B and C:

$$A = \frac{d^2(\text{Freq\_rear})}{d(\text{time\_in\_sweep})^2}$$

$$B = \frac{d(\text{Freq\_rear})}{d(\text{time\_in\_sweep})} - A^*(\text{time\_in\_sweep})$$

then, from two consecutive sweeps A, B values,
can calculate the rest:
   A1 = a + 2 * d
   B1 = d * k1 + b, B2 = d * k2 + b
Now solving for a, b, c and d :
   d = (B1 − B2)/(k1 − k2)
   a = A1 − 2 * d   or a = A2 − 2 * d
   b = B1 − d * k1 or b = B2 − d * k2
   c = C With reference to FIGS. 1-4, some embodiments of the invention further include at least one 'Doppler Adjust' module 4. When executed by the electronic waveform processor, the 'Doppler Adjust' module 4 causes the at least one electronic waveform processor to generate an Adjusted Doppler function for at least one sweep; the Adjusted Doppler function represents an adjusted Doppler shift derived using a non-varying range value. In usage, the range and closing velocity are commonly not quite constant during a sweep. However, feedback from the past values can be used to "linearize" the equations in FIG. 8 so that then-current value of range and vel (at index value N) can be solved with linear regression. In some embodiments, the non-varying range value is the range value of the last sample in the at least one sweep. The equations in Table 5 describe the process used to linearize the equations; the resulting Adjusted Doppler during the sweep, which, when 'linearly regressed' using the 'Linear Regression' module, is a line which has a slope and intercept. Solving for slope and intercept thus solves for Rng and Vel.

TABLE 5

Doppler Adjust

Krng(i) = [(−2/light) * (a * time_in_sweep + b)]
Doppler(i) = Krng(i) * Rng − Kdop * Vel
   (i ranges from 1 to N and N = number of samples in a sweep)
Doppler(i) = Krng(i) * Rng(i) − Kdop * Vel(i)
   (since Rng and Vel change slightly during sweep)
Can approximate values of Rng(i) and Vel(i) by integrating from previous values :
   time_samp = (N − i) * period
   Rng(N) = Rng(i) + Velprev * time_samp + ½ * Accprev * time_samp^2
   Vel(N) = Vel(i) + Accprev * time_samp
   Doppler(i) = Krng(i) * [Rng(N) − Velprev * time_samp − ½ * Accprev * time_samp^2] − Kdop * [Vel(N) − Accprev * time_samp]
Making a new adjusted version of Doppler
   Doppler_adj(i) = Doppler(i) + Krng(i) * [Velprev * time_samp + ½ * Accprev * time_samp^2] − Kdop * Accprev * time_samp
   Doppler_adj(i) = Krng(i) * Rng(N) − Kdop * Vel(N) (linearized, to solve for Rng(N) and Vel(N))

Embodiments further include a 'Linear Regression' module 6 in FIGS. 1-4. When executed by the electronic waveform processor, the Linear Regression module 6 causes the at least one electronic waveform processor to perform linear regression on the Adjusted Doppler function to produce a best-fit Linearly Regressed function, the slope of said Linearly Regressed function representing a first estimate of the range of said object to said target; the y-intercept of said Linearly Regressed function, when divided by the frequency change in the apparent target return Doppler with respect to change in range to said target, represents a first estimate of closing velocity of said object to said target; the variance of said best-fit Linearly Regressed function representing Doppler variance. Equations in Tables 6a and 6b provide equations for solving for the range, slope, range variance, and slope variance, using linear regression.

TABLE 6A

Linear Regression

Doppler_adj(i) = Krng(i) * Rng(N) − Kdop * Vel(N)
Linear regression is used to solve the above for Rng(N) and Vel(N), which are the latest Rng and Vel estimates:

$$\text{Rng}(N) = \frac{N\sum_{i=1}^{N} \text{Krng}(i)^*\text{Doppler\_adj}(i) - \sum_{i=1}^{N} \text{Krng}(i)^* \sum_{i=1}^{N} \text{Doppler\_adj}(i)}{N\sum_{i=1}^{N}(\text{Krng}(i))^2 - \left(\sum_{i=1}^{N}\text{Krng}(i)\right)^2}$$

Since the values of Krng(i) are evenly spaced, by a value of delk, can be written $$\text{Rng}(N) = \frac{\sum_{i=1}^{N}(\text{Krng}(1) + (i-1)^*\text{delKrng})^*\text{Doppler\_adj}(i) - }{\left(N\sum_{i=1}^{N}(\text{Krng}(1) + (i-1)^*\text{delKrng})^2 - \left(\sum_{i=1}^{N}(\text{Krng}(1) + (i-1)^*\text{delKrng})\right)^2\right)}$$

Simplifying:

$$\text{Rng}(N) = \frac{N}{\text{delKrng}^*\left(N\sum_{i=1}^{N}(i^2) - \left(\sum_{i=1}^{N}i\right)^2\right)} * \sum_{i=1}^{N}(i^*\text{Doppler\_adj}(i)) - $$

$$\frac{\sum_{i=1}^{N} i}{\text{delKrng}^*\left(N\sum_{i=1}^{N}(i^2) - \left(\sum_{i=1}^{N}i\right)^2\right)} * \sum_{i=1}^{N}\text{Doppler\_adj}(i)$$

Or:

$$\text{Rng}(N) = KN1 * \sum_{i=1}^{N}(i^*\text{Doppler\_adj}(i)) - KN2 * \sum_{i=1}^{N}\text{Doppler\_adj}(i)$$

TABLE 6B

Linear Regression $$\text{Vel}(N) = \frac{-1}{\text{Kdop}} * \left(\frac{\sum_{i=1}^{N}\text{Doppler\_adj}(i)}{N} - \text{Rng}(N) * \frac{\sum_{i=1}^{N}\text{Krng}(i)}{N}\right)$$

TABLE 6B-continued

Linear Regression $Vel(N) =$ $$\frac{-1}{Kdop} * \left( \frac{\sum_{i=1}^{N} Doppler\_adj(i)}{N} - Rng(N) * \frac{\sum_{i=1}^{N} (Krng(1) + (i-1)*delk)}{N} \right)$$

$$Vel(N) = \frac{1}{Kdop} * Krng(1) Rng(N) +$$

$$\frac{delk * \left( \sum_{i=1}^{N} i - N \right)}{N * Kdop} * Rng(N) - \frac{1}{N * Kdop} * \sum_{i=1}^{N} Doppler\_adj(i)$$

Or:
$Vel(N) =$ $$KN1V * Krng(1) * Rng(N) + KN2V * Rng(N) - KN3V * \sum_{i=1}^{N} Doppler\_adj(i)$$

Embodiments further include a 'Variance' module 8 in FIGS. 1-4. When run by the electronic waveform processor, the 'Variance' module 8 causes the electronic waveform processor to produce an estimate of variance of the first estimate of range of the object to the target using a mathematical relation of measured Doppler to range. One mathematical relation of the measured Doppler to range, and the corresponding relation of the measured Doppler variance to range variance, is given by the equations in FIG. 10.

TABLE 7

Variance $$Rng(N) = KN1 * \sum_{i=1}^{N} (i * Doppler\_adj(i)) - KN2 * \sum_{i=1}^{N} Doppler\_adj(i)$$

$Rng\_dot(N) =$ $$\sum_{i=1}^{N} Doppler\_adj(i) * \frac{\partial Rng(N)}{\partial Doppler\_adj(i)} \bigg| Doppler\_adj(i) = Doppler\_adj\_mean(i)$$

$Rng\_dotm(N) = Rng\_dot(N) | Doppler\_adj(i) = 0, (Doppler\_adj(i))^2 = Doppler\_variance$
$Rng\_mean(N) = Rng\_dotm(N) + Rng(N) | Doppler\_adj(i) = Doppler\_adj\_mean(i)$
$Rng\_mean(N) =$ $$KN1 * \sum_{i=1}^{N} (i * Doppler\_adj\_mean(i)) - KN2 * \sum_{i=1}^{N} Doppler\_adj\_mean(i)$$

$Rng\_variance(N) = (Rng\_dot(N))^2 | Doppler\_adj(i) = 0,$
$(Doppler\_adj(i))^2 = Doppler\_variance - Rng\_dotm(N)^2$
$Rng\_variance(N) =$ $$Doppler\_variance * \left( KN1^2 \sum_{i=1}^{N} i^2 - 2 * KN1 * KN2 \sum_{i=1}^{N} i + N * KN2^2 \right)$$

The Variance module 8 in FIGS. 1-4, when executed by the electronic waveform processor, further causes the electronic waveform processor to produce an estimate of variance of the first estimate of closing velocity of the object to the target using a mathematical relation of measured Doppler to closing velocity. One mathematical relation of the measured Doppler to closing velocity, and the corresponding relation of the measured Doppler variance to closing velocity variance, is given by the equations in Table 8.

TABLE 8

Variance $Vel(N) =$ $$KN1V * Krng(1) * Rng(N) + KN2V * Rng(N) - KN3V * \sum_{i=1}^{N} Doppler\_adj(i)$$

$$Vel\_dot(N) = \sum_{i=1}^{N} Doppler\_adj(i) * \frac{\partial Vel(N)}{\partial Doppler\_adj(i)} \bigg| Doppler\_adj(i) =$$

$$Doppler\_adj\_mean(i) + Krng(1) * \frac{\partial Vel(N)}{\partial Krng(1)} \bigg| Krng(1) =$$

$$Krng\_mean(1) + Rng(N) * \frac{\partial Vel(N)}{\partial Rng(N)} \bigg| Rng(N) = Rng\_mean(N)$$

$Vel\_dotm(N) = Vel\_dot(N) | Dop, Krng, Rng = 0; (Dop)^2, (Krng)^2, (Rng)^2 = Doppler\_variance, Krng\_variance, Rng\_variance$
$Vel\_mean(N) = Vel\_dotm(N) + Vel(N) | Dop, Krng, Rng = Doppler\_mean, Krng\_mean, Rng\_mean$
$Vel\_mean(N) = KN1V * Krng\_mean(1) * Rng\_mean(N) +$ $$KN2V * Rng\_mean(N) - KN3V * \sum_{i=1}^{N} Doppler\_adj\_mean(i)$$

$Vel\_variance(N) = (Vel\_dot(N))^2 | Dop, Krng, Rng = 0; (Dop)^2, (Krng)^2,$
$(Rng)^2 = Doppler\_variance, Krng\_variance, Rng\_variance - Vel\_dotm(N)^2$ $Vel\_variance(N) = KN1V^2 * (Krng\_mean^2 * Rng\_variance + Krng\_variance * Rng\_mean^2 + Krng\_variance * Rng\_variance) +$ TABLE 8-continued Variance $KN2V^2 * Rng\_variance + 5 * KN3V^2 * Doppler\_variance + 2 * KN1V * KN2V * Krng\_mean * Rng\_variance$ Some embodiments further include at least one 'Refining' module 10 in FIGS. 1-4. When run by the electronic waveform processor, the Refining module 10 causes the electronic waveform processor to produce a refined estimate of range and a refined estimate of closing velocity using the first estimate of range of the object to the target, the first estimate of closing velocity of the object to the target, the estimate of variance of the first estimate of range, and the estimate of variance of the first estimate of closing velocity. In some embodiments, the Refining module 10 is a Kalman filter. The Kalman filter refines the range and closing velocity estimates via a least-error estimation of the true signal's value when corrupted by noise. The estimates of range and closing velocity noise are simply their respective variance estimates, and are used to determine the most probable target range, closing velocity and acceleration.

Some embodiments further include computer readable instructions referred to herein as 'Dop Com' module 12. When executed by the electronic waveform processor, the 'Dop Com' module 12 causes the electronic waveform processor to provide an estimated prediction of where in Doppler frequency the target will appear at the next instant of time from next time values of Krng, Rng Kdop and Vel using Equation 2.

$$Dop\_comm = Krng * Rng - Kdop * Vel$$

The estimated prediction being derived from a next predicted sweep value and the next predicted range and closing velocity from object to target. The estimated prediction of where in Doppler frequency the target will appear allows the object to position its Doppler frequency tracker to the next frequency location in preparation to acquire the next target signal sample.

Method embodiments include: transmitting a non-linear swept electromagnetic FM signal, using a transmitter; receiving a reflected signal at a reflected signal electronic sensor electromechanically associated with the object, the reflected signal corresponding to the non-linear swept electromagnetic FM signal having been reflected from a predetermined target; and generating an estimate of the range from the object to the predetermined target and an estimate of the closing velocity of the object and the predetermined target by electronically processing the reflected signal received at the second electronic sensor and an apparent emitted signal corresponding to the non-linear swept electromagnetic signal emitted from the transmitter received at the first electronic sensor.

Some method embodiments include generating an estimate of the range from the object to the predetermined target and an estimate of the closing velocity of the object and the predetermined target by electronically processing, on an electronic waveform processor, the reflected signal received at the second electronic sensor and the apparent emitted signal corresponding to the non-linear swept electromagnetic signal emitted from the transmitter received at the first electronic sensor comprises running a Quad Regression module on the electronic waveform processor, the Quad Regression module causing the at least one electronic waveform processor to calculate predetermined aspects of the non-linear swept electromagnetic signal emitted from the electronic transmitter, wherein the predetermined aspects of the non-linear swept electromagnetic signal emitted from the electronic transmitter includes: an expected frequency change in the 'apparent Doppler shift' with respect to change in closing velocity [kdop]; an expected frequency change in the 'apparent Doppler shift' with respect to change in range from the object to the target [krng]; and expected rate of change of the frequency change in the 'apparent Doppler shift' with respect to change in range to the target (the rate of change being a linear function) [delkrng].

Some method embodiments further include running a Doppler Adjust module on the electronic waveform processor; when run, the Doppler Adjust module causing the at least one electronic waveform processor to generate an Adjusted Doppler function for at least one sweep; the Adjusted Doppler function represents an adjusted Doppler shift derived using a non-varying range value. In some embodiments, the non-varying range value is the range value of the last sample in the at least one sweep.

Some method embodiments further include running a Linear Regression module on the electronic waveform processor; when run, the Linear Regression module causing the at least one electronic waveform processor to perform linear regression on the Adjusted Doppler function to produce a best-fit Linearly Regressed function, the slope of the Linearly Regressed function representing a first estimate of the range from the object to the target; the y-intercept of the Linearly Regressed function, when divided by the frequency change in the apparent target return Doppler with respect to change in range to the target, representing a first estimate of closing velocity of the object to the target; the variance of measured Doppler data around the best-fit Linearly Regressed function representing Doppler variance.

Some method embodiments further include running a Variance module on the electronic waveform processor; when run by the electronic waveform processor, the Variance module causes the electronic waveform processor to provide an estimated variance of the first estimate of range of the object to the target using a mathematical relation of measured Doppler to range and an estimate of variance of the first estimate of closing velocity of the object to the target using a mathematical relation of measured Doppler to closing velocity.

Some method embodiments further include running at least one Refining Module; when run by the electronic waveform processor, the Refining module causing the electronic waveform processor to produce a refined estimate of range and a refined estimate of closing velocity using the first estimate of range from the object to the target, the first estimate of closing velocity of the object and the target, the estimate of variance of the first estimate of range, and the estimate of variance of the first estimate of closing velocity.

Some method embodiments further include running at least one Dop Com module; when run by the electronic waveform processor, the Dop Com module causing the electronic waveform processor to provide an estimated prediction of where in Doppler frequency the target will appear at the next instant of time; the estimated prediction being derived from a next predicted sweep value, and the next predicted range and closing velocity from object to target; the estimated prediction allowing the object to position its Doppler frequency tracker to the next frequency location in preparation to acquire the next target signal sample.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A radar system comprising:
   an electronic transmitter associated with a vehicle and adapted to emit a non-linear swept electromagnetic FM signal, said non-linear swept electromagnetic FM signal having a waveform mathematically described by a second-order-polynomial;

an apparent emitted signal electronic sensor associated with an object whose range and closing velocity to a target will be estimated, said apparent emitted signal electronic sensor adapted to receive a semi-active mode apparent emitted signal, said semi-active mode apparent emitted signal corresponding to said non-linear swept electromagnetic signal emitted from said electronic transmitter;

a reflected signal electronic sensor associated with said object and adapted to receive a reflected signal, said reflected signal corresponding to said non-linear swept electromagnetic signal having been reflected from said target;

at least one electronic waveform processor operatively associated with said apparent emitted signal electronic sensor and said reflected signal electronic sensor and configured and programmed to generate an estimate of the range from said object to said target and an estimate of said closing velocity of said object to said target by processing said semi-active mode apparent emitted signal and said reflected signal; and a plurality of computer readable instruction modules executably associated with said at least one electronic waveform processor; said plurality of computer readable instruction modules including:

at least one Doppler Adjust module; when run by said electronic waveform processor, said Doppler Adjust module causing said at least one electronic waveform processor to generate an Adjusted Doppler function for at least one sweep; said Adjusted Doppler function representing apparent Doppler shift derived using a non-varying range value; and at least one Linear Regression module; when run, said Linear Regression module causing said at least one electronic waveform processor to perform linear regression on said Adjusted Doppler function to produce a best-fit Linearly Regressed function, the slope of said Linearly Regressed function representing a first estimate of the range of said object to said target; the y-intercept of said Linearly Regressed function, when divided by krng, representing a first estimate of closing velocity of said object to said target; the variance of said best-fit Linearly Regressed function representing Doppler variance.

2. The system of claim 1 wherein said plurality of computer readable instruction modules further comprising at least one Quad Regression module; when run by said electronic waveform processor, said Quad Regression module causing said at least one electronic waveform processor to calculate predetermined aspects of said semi-active mode apparent emitted signal.

3. The system of claim 2 wherein said predetermined aspects of said non-linear swept electromagnetic signal comprises:
kdop;
krng; and
delkrng.

4. The system of claim 1 wherein said non-varying range value is the range value of a last sample in said at least one sweep.

5. The system of claim 1 wherein said plurality of modules further comprising a Variance module; when run by said electronic waveform processor, said Variance module causes said electronic waveform processor to produce an estimate of variance of said first estimate of range of the object to said target using a mathematical relation of measured Doppler to range.

6. The system of claim 5 wherein said Variance module, when run by said electronic waveform processor, further causes said electronic waveform processor to produce an estimate of variance of said first estimate of closing velocity of the object to said target using a mathematical relation of measured Doppler to closing velocity.

7. The system of claim 6 wherein said plurality of modules further comprises at least one Refining Module; when run by said electronic waveform processor, said Refining module causes said electronic waveform processor to produce a refined estimate of range and a refined estimate of closing velocity using said first estimate of range of said object to said target, said first estimate of closing velocity of said object to said target, said estimate of variance of said first estimate of range, and said estimate of variance of said first estimate of closing velocity.

8. The system of claim 7 wherein said at least one Refining Module is a Kalman filter.

9. The system of claim 1 wherein said plurality of modules further comprises a Dop Com module; when run by said electronic waveform processor, said Dop Com module causing said electronic waveform processor to provide an estimated prediction of where in Doppler frequency said target will appear at the next instant of time; said estimated prediction being derived from a next predicted sweep value, and the next predicted range and closing velocity from object to target; said estimated prediction allowing said object to position its Doppler frequency tracker to the next frequency location in preparation to acquire the next target signal sample.

10. A radar tracking method comprising:
transmitting a non-linear swept electromagnetic FM signal using a transmitter, said non-linear swept electromagnetic FM signal having a waveform mathematically described by a second-order-polynomial;

receiving a semi-active mode apparent emitted signal at an apparent emitted signal electronic sensor associated with an object whose range and closing velocity to a target will be estimated, said apparent emitted signal corresponding to said non-linear swept electromagnetic FM signal emitted from said electronic transmitter;

receiving a reflected signal at a reflected signal electronic sensor electromechanically associated with said object, said reflected signal corresponding to said non-linear swept electromagnetic FM signal having been reflected from a predetermined target;

generating an estimate of the range from said object to said predetermined target and an estimate of said closing velocity of said object and said predetermined target by electronically processing, on an electronic waveform processor, said reflected signal and said semi-active mode apparent emitted signal;

running a Doppler Adjust module on said electronic waveform processor; when run, said Doppler Adjust module causing said at least one electronic waveform processor to generate an Adjusted Doppler function for at least one sweep; said Adjusted Doppler function representing apparent Doppler shift derived using a non-varying range value; and running a Linear Regression module on said electronic waveform processor; when run, said Linear Regression module causing said at least one electronic waveform processor to perform linear regression on said Adjusted Doppler function to produce a best-fit Linearly Regressed function, the slope of said Linearly Regressed function representing a first estimate of the range from said object to said target; the y-intercept of said Linearly Regressed function, when divided by said frequency change in the apparent target return Doppler with respect to change in range to said target, representing a first estimate of closing velocity of said object to said target; the variance of said best-fit Linearly Regressed function representing Doppler variance.

11. The radar tracking method of claim 10 wherein said generating an estimate of the range from said object to said predetermined target and an estimate of said closing velocity of said object and said predetermined target by electronically processing, on an electronic waveform processor, said reflected signal and said semi-active mode apparent emitted signal comprises running a Quad Regression module on said electronic waveform processor, said Quad Regression module causing said at least one electronic waveform processor to calculate predetermined aspects of said semi-active mode apparent emitted signal.

12. The radar tracking method of claim 11 wherein said predetermined aspects of said non-linear swept electromagnetic signal emitted from said electronic transmitter comprise:
kdop;
krng; and
delkrng.

13. The radar tracking method of claim 10 wherein said non-varying range value is the range value of a last sample in said at least one sweep.

14. The radar tracking method of claim 10 further comprising running a Variance module on said electronic waveform processor; when run by said electronic waveform processor, said Variance module causes said electronic waveform processor to provide an estimated variance of said first estimate of range of the object to said target using a mathematical relation of measured Doppler to range and an estimate of variance of said first estimate of closing velocity of the object to said target using a mathematical relation of measured Doppler to closing velocity.

15. The radar tracking method of claim 14 further comprising running at least one Refining Module; when run by said electronic waveform processor, said Refining module causing said electronic waveform processor to produce a refined estimate of range and a refined estimate of closing velocity using said first estimate of range from said object to said target, said first estimate of closing velocity of said object and said target, said estimate of variance of said first estimate of range, and said estimate of variance of said first estimate of closing velocity.

16. The radar tracking method of claim 10 further comprising running at least one Dop Com module; when run by said electronic waveform processor, said Dop Com module causing said electronic waveform processor to provide an estimated prediction of where in Doppler frequency said target will appear at a next instant of time; said estimated prediction being derived from a next predicted sweep value, and a next predicted range and closing velocity from object to target; said estimated prediction allowing said object to position its Doppler frequency tracker to a next frequency location in preparation to acquire a next target signal sample.

* * * * *